(12) United States Patent
Huang

(10) Patent No.: US 7,837,160 B2
(45) Date of Patent: Nov. 23, 2010

(54) SIMPLE HEAT-DISSIPATION PAD FOR NOTEBOOK COMPUTER

(76) Inventor: Cheng Yu Huang, 3F, 42, Alley 47, Chanshih Road, Taishan, Taipei (TW)

(*) Notice: Subject to any disclaimer, the term of this patent is extended or adjusted under 35 U.S.C. 154(b) by 391 days.

(21) Appl. No.: 12/146,157

(22) Filed: Jun. 25, 2008

(65) Prior Publication Data

US 2010/0200196 A1    Aug. 12, 2010

(51) Int. Cl.
*F16M 11/24* (2006.01)
(52) U.S. Cl. .................. 248/188.2; 248/188.8; 248/558
(58) Field of Classification Search .............. 248/188.2, 248/188.3, 188.4, 188.5, 188.8, 558
See application file for complete search history.

(56) References Cited

U.S. PATENT DOCUMENTS

| | | | | |
|---|---|---|---|---|
| 4,281,739 A * | 8/1981 | Keiser | ......................... | 181/207 |
| 2003/0231466 A1* | 12/2003 | Huang | ......................... | 361/687 |
| 2008/0179470 A1* | 7/2008 | Dabrowski | ............... | 248/188.2 |
| 2010/0186928 A1* | 7/2010 | Chen | ............................ | 165/67 |
| 2010/0219729 A1* | 9/2010 | Huang | ..................... | 312/330.1 |

* cited by examiner

*Primary Examiner*—Ramon O Ramirez
(74) *Attorney, Agent, or Firm*—Jackson IPG PLLC; Demian K. Jackson

(57) ABSTRACT

A simple heat-dissipation pad for a notebook computer includes two symmetrical pad elements which can be coupled to each other via engaging blocks and engaging holes formed thereon, so as to form a decorative object having a spherical shape or other shapes. The pad elements, when separated from each other, can be used to support the notebook computer at a higher position and provide anti-slip and proper heat-dissipation effects.

1 Claim, 3 Drawing Sheets

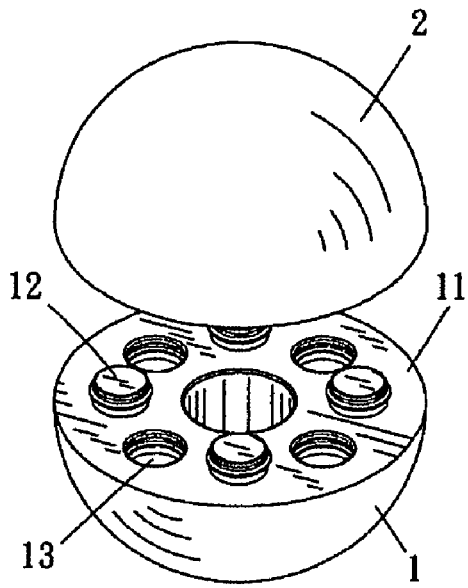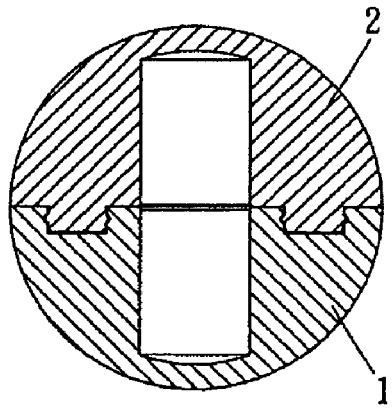
Fig. 1
Fig. 2
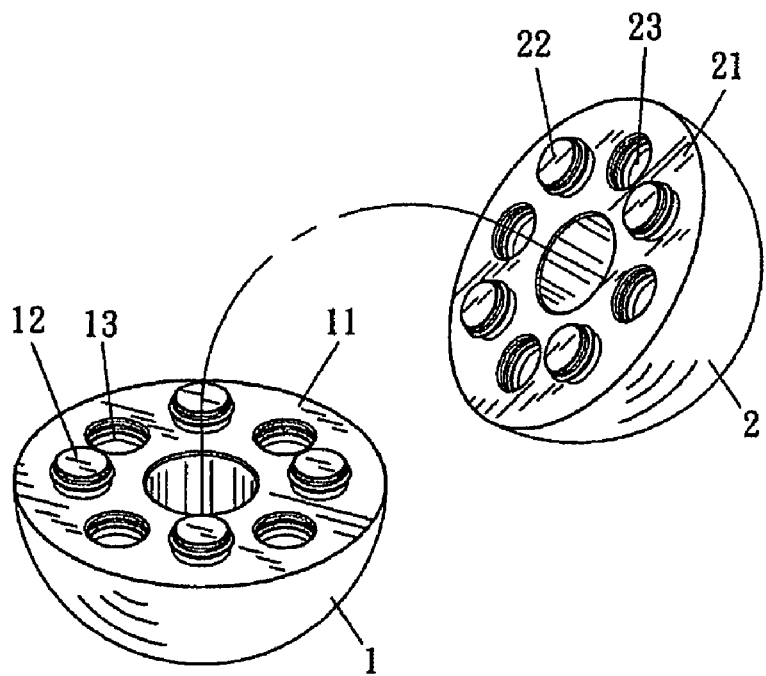
Fig. 3

SIMPLE HEAT-DISSIPATION PAD FOR NOTEBOOK COMPUTER

BACKGROUND OF THE INVENTION

1. Technical Field

The present invention relates to a heat-dissipation pad, and more particularly, to a simple heat-dissipation pad for a notebook computer, wherein the heat-dissipation pad comprises two symmetrical pad elements which can be coupled to each other to form a decorative object having a spherical shape or other shapes, or alternately, the pad elements can be separated from each other and placed beneath the notebook computer to support the notebook computer at a higher position and provide anti-slip and proper heat-dissipation effects.

2. Description of Related Art

In recent years, notebook computers have been made lighter, smaller and capable of operating for a longer time, so as to give enhanced portability and more convenience of use. As wireless networking becomes prevalent, notebook computers are even more popular among computer uses because notebook computers are very suitable for use at any desired location. However, due to its structural design, a notebook computer has much poorer heat-dissipation capabilities than a desktop PC, a server computer or other IT equipment.

Generally, a notebook computer tends to generate the most heat on its backside thereof where the hard drive, the CPU and the power supply are provided. Since a notebook computer is usually placed on a tabletop for use, the part of the notebook computer that tends to generate the most heat is adjacent to the tabletop and thereby causes heat accumulation.

To solve this problem, the industry has developed various heat-dissipation pads for notebook computers, and these heat-dissipation pads are made of different materials and have similar shapes and sizes as those of the notebook computers, so that the notebook computers can be disposed on the pads for better heat dissipation. However, such heat-dissipation pads are made according to the dimensions of notebook computers, and therefore usually have a larger area or volume than the notebook computers themselves. In addition to an undesirably large volume and a complicated structure, the aforesaid heat-dissipation pads are equipped with cooling fans that must be activated by additional power supply. As a result, not only is it inconvenient to carry such heat-dissipation pads along with notebook computers, but also the pads have higher production costs and selling prices.

BRIEF SUMMARY OF THE INVENTION

In view of the shortcomings of the conventional heat-dissipation pads for notebook computers, the inventor of the present invention researched and developed a simple heat-dissipation pad for a notebook computer as disclosed herein, wherein the heat-dissipation pad comprises two symmetrical pad elements that can be coupled with each other to form a decorative object having spherical or other shapes, or alternatively, the two pad elements can be separated from each other and placed beneath the notebook computer to support the notebook computer at a higher location and provide anti-slip and proper heat-dissipation effects.

The present invention provides a heat-dissipation pad for a notebook computer, and more particularly, a simple heat-dissipation pad for a notebook computer, comprising two symmetrical pad elements which, when not coupled to each other, can be used to support the notebook computer at a higher position and provide anti-slip and proper heat-dissipation effects. When the heat-dissipation pad is not in use, the pad elements can be coupled to each other to form a decorative object having a spherical shape or other shapes and be conveniently carried along with the notebook computer.

BRIEF DESCRIPTION OF THE SEVERAL VIEWS OF THE DRAWINGS

The invention as well as a preferred mode of use, further objectives and advantages thereof will best be understood by reference to the following detailed description of an illustrative embodiment when read in conjunction with the accompanying drawings, wherein:

FIG. 1 is an exploded perspective view of the present invention;

FIG. 2 is an assembled cross-sectional view of the present invention;

FIG. 3 is another exploded perspective view of the present invention;

DETAILED DESCRIPTION OF THE INVENTION

Figure 4:
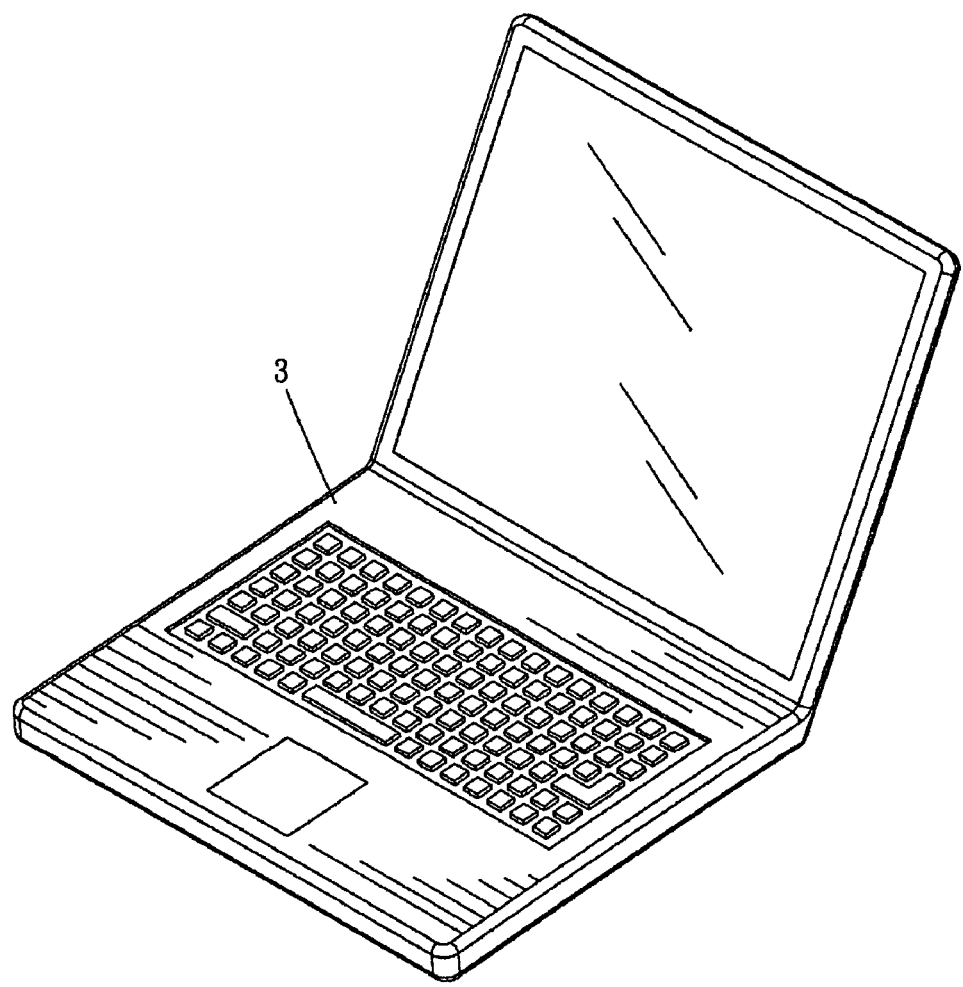
FIG. 4 is a perspective view showing an application of the present invention to a notebook computer.

Referring to FIGS. 1 to 4, a simple heat-dissipation pad for a notebook computer according to the present invention comprises two symmetrical pad elements 1 and 2. The two pad elements 1 and 2 can be identical to each other or symmetrical with respect each other and form a practical heat-dissipation pad. The two pad elements 1 and 2 have connecting surfaces 11 and 21, respectively, wherein each of the connecting surfaces 11 and 21 is formed with a plurality of engaging blocks 12 or 22, and a plurality of engaging holes 13 or 23 which are symmetrical with respect to the engaging blocks 11 or 22.

Referring now to FIGS. 1 and 2, the engaging blocks 12 and the engaging holes 13 on the pad element 1 can be engaged with the engaging blocks 22 and the engaging holes 23 on the pad element 2, so that the pad elements 1 and 2 are coupled to each other and form a decorative object having a spherical shape or other shapes.

Figure 5:
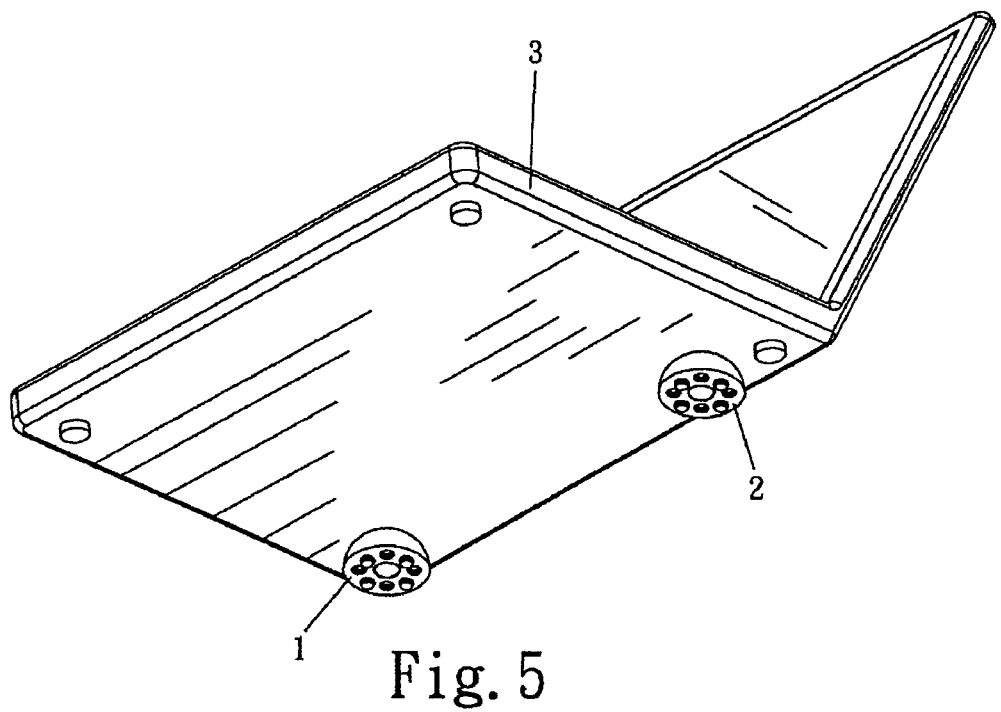
FIG. 5 is another perspective view showing the application of the present invention to the notebook computer.
Figure 6:
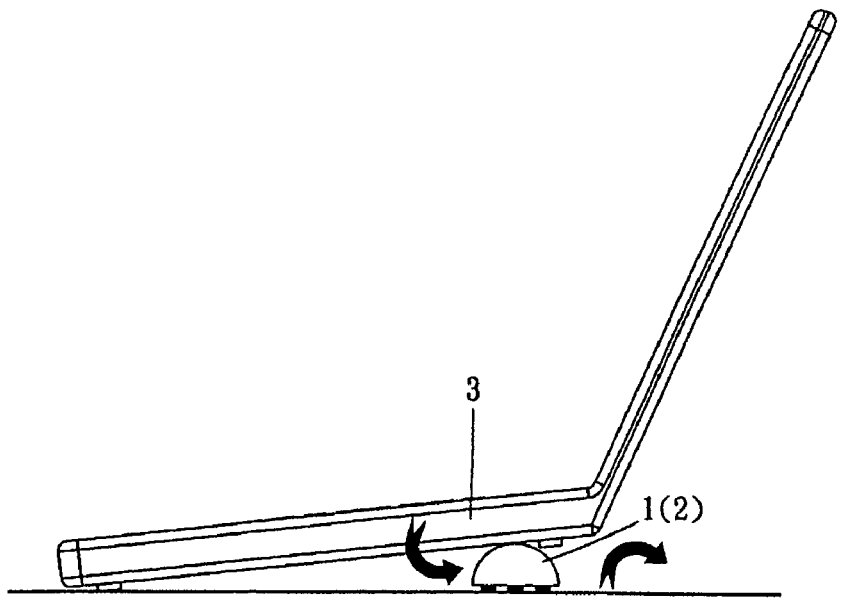
FIG. 6 is a side view showing the application of the present invention to the notebook computer.

Referring to FIGS. 4 to 6, the two symmetrical pad elements 1 and 2 can be separated from each other and placed beneath a forward edge of a notebook computer 3 with the connecting surface 11 and 21 facing down. Thus, the forward edge of the notebook computer 3 is lifted up to facilitate air circulation and prevent heat accumulation, thereby providing a proper hear-dissipation effect.

While the present invention has been described herein and depicted in the accompanying drawings with reference to an embodiment having a spherical shape, it is understood that the embodiment is not intended to limit the scope of the present invention. Therefore, all equivalent embodiments which are implemented according to the principle and structure disclosed herein and have shapes other than the spherical shape, such as a rectangular shape, an obliquely conical shape or a polyhedral shape, should be encompassed by the following claims.

The invention claimed is:

1. A simple heat-dissipation pad for a notebook computer, comprising two identical or symmetrical pad elements, each having a connecting surface formed with a plurality of engaging blocks and a plurality of engaging holes symmetrical with respect to the plurality of engaging blocks, wherein the engaging blocks and the engaging holes on one of the pad elements can be engaged with the engaging blocks and the engaging holes on the other pad element so that the pad elements form a decorative object having a spherical shape or other shapes, or the pad elements can be separated from each other and placed beneath a forward edge of the notebook computer with the connecting surface facing down, thereby preventing heat accumulation and providing a proper heat-dissipation effect.

* * * * *